Nov. 14, 1939.　　　S. A. FORTER　　　2,179,848
GLASS FURNACE AND METHOD OF OPERATION
Filed Feb. 17, 1939　　　2 Sheets-Sheet 1
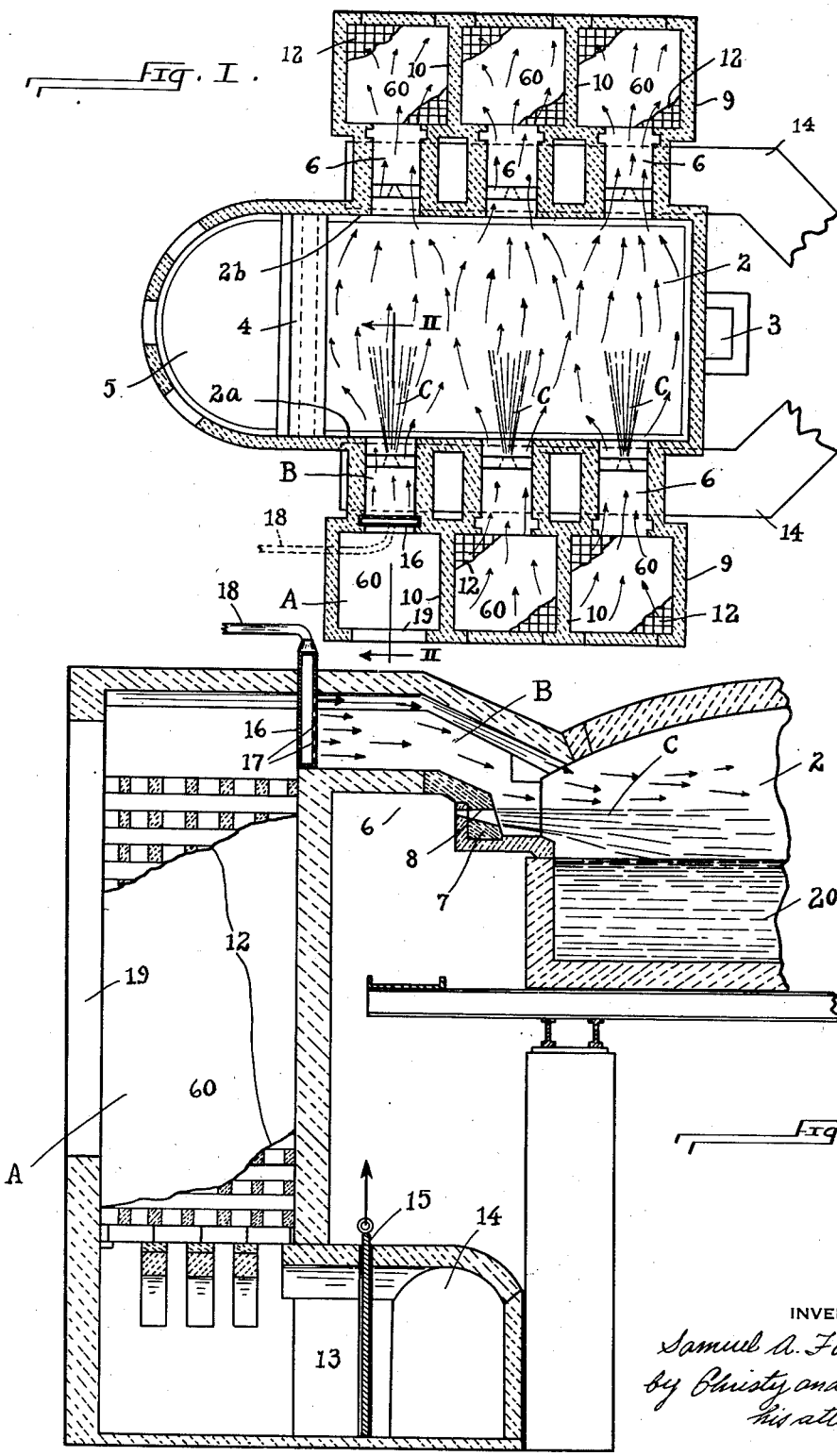
INVENTOR
Samuel A. Forter
by Christy and Wharton
his attorneys Nov. 14, 1939.    S. A. FORTER    2,179,848
GLASS FURNACE AND METHOD OF OPERATION
Filed Feb. 17, 1939    2 Sheets-Sheet 2
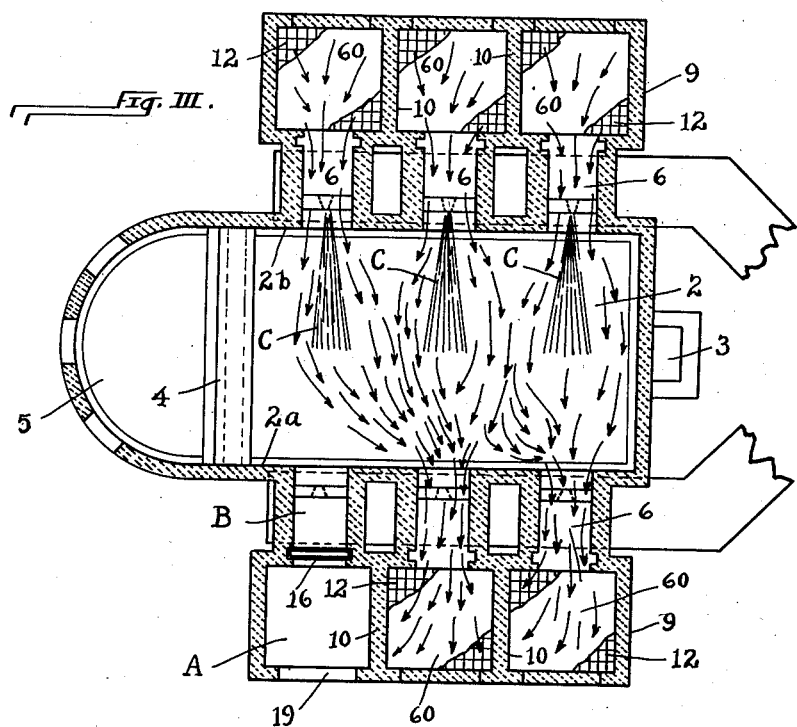
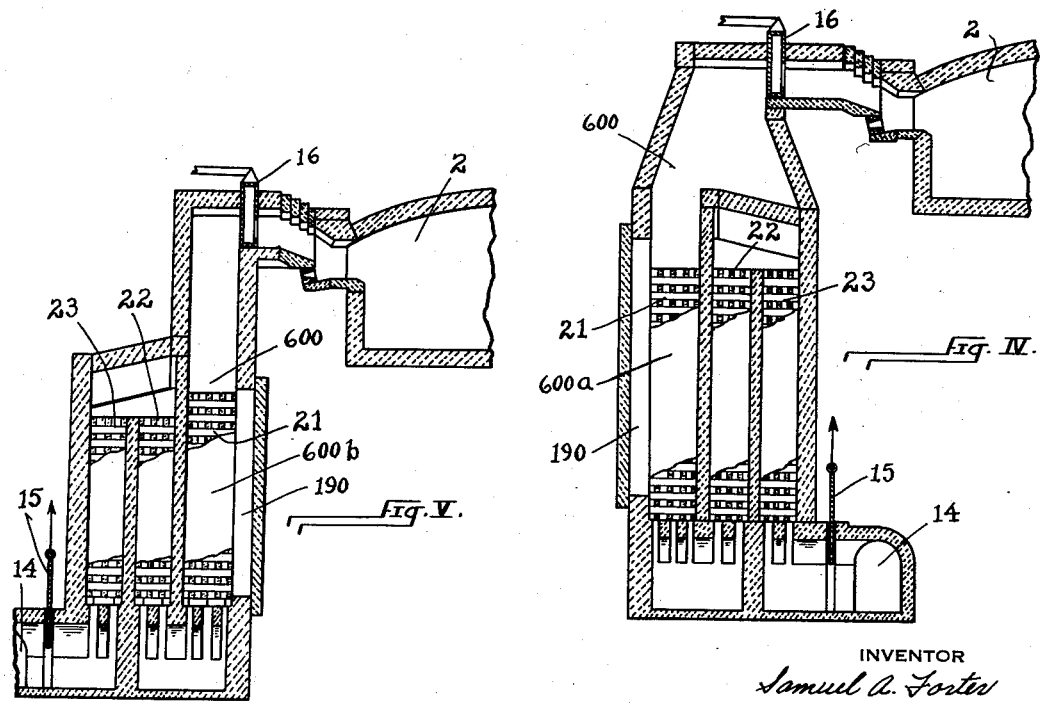
INVENTOR
Samuel A. Forter
by Christy and Wharton
his attorneys

Patented Nov. 14, 1939

2,179,848

UNITED STATES PATENT OFFICE

2,179,848

GLASS FURNACE AND METHOD OF OPERATION

Samuel A. Forter, Avalon, Pa., assignor to Forter-Teichmann Company, a corporation of Pennsylvania Application February 17, 1939, Serial No. 256,899

7 Claims. (Cl. 263—15)

My invention relates to glass furnaces, and consists both in structure and in method of operation.

Glass furnaces are regenerative furnaces, furnaces provided with regenerators for preheating the combustion-sustaining air, and in some cases, when gaseous fuel is used, regenerators are also provided for preheating the fuel. The usual glass furnace is fired from the side; that is, the firing ports are arranged on the opposite sides of the furnace. In the usual furnace several firing ports are provided on each side; they are spaced apart longitudinally of the glass-refining chamber within the furnace, with the ports on one side of the furnace severally aligned with those on the opposite side.

In normal operation, the ports and regenerators on one side of the furnace deliver columns of fuel and preheated air into the furnace chamber, while the hot waste gases, the products of combustion, are drawn through the ports and regenerators on the opposite side of the furnace to a stack or other outlet. The hot waste gases, flowing through the regenerators, yield large stores of heat to the refractory checkerwork in the regenerators. From time to time the operation is reversed: the ports which had been serving as the firing ports become the outgo ports, and the ports which had been serving as the outgo ports become the firing ports. In such manner the regenerators on opposite sides of the furnace alternately receive and yield stores of heat, and thus continuity of furnace operation is established and maintained.

As is known, the outgoing gases of the furnace carry particles of dust and molten slag into the regenerators, and such dust and slag accumulate in the regenerators, ant tend to clog the passages within the checkerwork. Over a period of time the effect of these accumulations becomes so detrimental to furnace efficiency that the normal operation of the furnace must be interrupted, and the checkerwork in the regenerators torn out and rebuilt. The operating losses incident to such interruptions are substantial, and for years the art has been seeking a remedy.

In attacking the problem, furnace builders have developed checker-bricks of elaborated and specialized designs, and through the use of such bricks the accumulation of dust and slag in the passages of the checkerwork has been minimized, with the consequence that the effective lives of the regenerators have been substantially prolonged. It has been found, however, that the cost of these specialized bricks is much higher than of bricks of standard form, and the gains enjoyed, by thus increasing or prolonging the campaigns of normal furnace operation, are in large measure neutralized by the higher costs of furnace construction. Additionally, experience has shown that a new regenerator made of the less costly bricks is far more efficient than an older regenerator constructed of the more costly bricks. My invention affords a solution of the problem.

More particularly, the invention consists in refinements in furnace construction and in method of operation, by virtue of which it becomes possible to repair or rebuild the regenerators of a reversing furnace, without interrupting the normal reversing operation of the furnace—the operation that consists in firing the furnace alternately on one side and the other. The economies and advantages of such practice will be readily appreciated.

Before proceeding with a detailed consideration of the method of the invention, I shall describe a furnace structure, in which my method may be practiced. Such a furnace is illustrated in the accompanying drawings, in which:

Fig. I is a diagrammatic view, showing the furnace in horizontal section. Fig. II is a view to larger scale, showing one of the port structures of the furnace in vertical section, on the plane II—II of Fig. I. Fig. III repeats the view of Fig. I, with this qualification: whereas Fig. I illustrates the flow of fuel and gases when the furnace is fired from one side, Fig. III illustrates the flow when the furnace is reversed, and fired from opposite side. And Figs. IV and V are views comparable with Fig. II, severally illustrating permissive modifications in regenerator construction.

Referring to the drawings, the body of the furnace is of conventional construction, including a glass-refining chamber 2, a charging chamber or "dog-house" 3, a bridge wall 4, and a draw-chamber 5. The firing ports 6 of the furnace open through the opposite side walls 2a and 2b of the refining chamber. In this case six ports are provided, three on each side of the furnace; the ports are arranged in spaced-apart relation longitudinally of the refining chamber 2, and the ports on one side are severally aligned with those on the opposite side, as shown.

I have found the practice of the invention to be particularly, if not essentially, adapted to ports that fire liquid fuel, and in this case the ports 6 are such in kind. More specifically, each port 6 includes at an interval from its mouth a vertically extending wall portion 7, in which is provided an orifice 8, and adjacent to the port suitable apparatus (not shown) is arranged for jetting a column C of atomized liquid fuel through such orifice and into the refining chamber of the furnace. (Further detail in the matter of port structure may be obtained in Letters Patent No. 2,096,695, granted to me October 19, 1937.)

On each side of the furnace regenerators 9 are provided for preheating the combustion-sustaining air that, in known way, flows into the ports 6 on the firing side of the furnace, side 2a in Fig. I. The ports direct the flowing air downward, toward the surface of the bath 20 of glass undergoing refinement in chamber 2, and into such streams of air the columns C of fuel are jetted.

In accordance with the invention, vertical partitions 10 are provided within the regenerators, and in such way three separate regenerator compartments 60 are provided on each side of the furnace, one for each of the ports 6. Each compartment includes a body 12 of checkerwork, and such checkerwork may be of known inexpensive and simple construction. Beneath the checkerwork 12, each compartment includes a passage 13 (Fig. II) that opens into a flue 14, and above the body of checkerwork the compartment communicates with the port 6, with which it is organized. Thus, each compartment provides in effect an independent regenerator; that is, each port 6 is provided with its own, individual regenerator. Dampers 15 (Fig. II) are provided for controlling flow between the regenerator compartments 60 severally and the particular flue 14 with which the compartments communicate. And each port is provided with a gate 16 that controls flow between the port and its associated regenerator compartment. (Of the several port and regenerator units the gate 16 in only one is in closed position, and, due to the plane of section on which the furnace is shown, only that gate appears in Figs. I and III.)

Advantageously, each gate 16 of hollow construction, including one or more windows or orifices 17 in the side wall that faces the furnace chamber. And a duct 18, extending from a fan or blower (not shown), is adapted at the will of the furnace operator to deliver a stream of air into the gate. When, under the circumstances presently to be described, the gate is closed, a continuously flowing stream of air is delivered through the gate into the port, as indicated by the arrows in Fig. II, and such stream of air not only serves to protect the gate from heat radiated from the furnace chamber, but provides an auxiliary or alternate supply of combustion-sustaining air.

In normal operation of the furnace all of the dampers 15 and gates 16 stand in open positions; the flue 14 on the side of the furnace being fired (side 2a, Fig. I) carries air to the passages 13 that severally open into the regenerator compartments 60. The air, entering the regenerator compartments in divided stream, rises through the bodies 12 of hot checkerwork and is highly preheated; immediately upon emerging from the checkerwork the streaming air enters the ports 6, whence it flows with the fuel (C) into the furnace chamber 2. Each port is thus adapted to direct a burning column of fuel and air across the furnace chamber. The hot waste gases are drawn through the ports on the outgo side of the furnace (side 2b, Fig. I); that is to say, on the outgo side of the furnace the hot waste gases, under the draft of the furnace stack, exit through the three ports, and descend through the regenerators with which the ports severally communicate, yielding stores of heat to the bodies of checkerwork in such regenerators. From the regenerators the waste gases are delivered through flue 14 to the stack, or other outlet. When the regenerators on the firing side of the furnace have cooled to such degree that the ingoing air is no longer sufficiently preheated, the furnace is reversed; the ports that had been serving as the outgo ports become the firing ports, and the ports that had been the firing ports become the outgo ports. (Note Fig. III.) Such is the normal method of operating the furnace.

In the course of such normal operation of the furnace, the checkerwork in the regenerators becomes fouled, as already mentioned, and then it is that the method of my invention—a method consisting in certain refinements or elaborations of the normal mode of furnace operation—is brought into practice. In exemplary way I shall describe the practice of the method in the rebuilding of the checkerwork in one of the compartments 60, and a consideration of such description will afford a clear understanding of the manner in which all regenerators of a furnace may be reconditioned in accordance with the invention.

The regenerator chosen for illustration is shown at A in the drawings. Preparatory to the reconstruction of the checkerwork 12 in this regenerator or regenerator compartment, the damper 15 and gate 16 appurtenant thereto are closed (Fig. II), thus blanking communication between the port 6 above the checkerwork and the flue 14 below. Then an opening 19 in the outer wall of the regenerator (which opening is normally closed by refractory-lined bulkhead or door) is uncovered, and the walls and checkerwork within the compartment, thus exposed to the outer atmosphere, are allowed to cool. When the temperature within the compartment has dropped to 100° F., more or less, workmen enter and do the work that is required. The checkerwork may be cleaned, merely, or it may be repaired, or it may be entirely removed and renewed.

While the work is going forward the operation of the furnace is continued without interruption. When the ports on the side 2a of the furnace are operating as the firing ports, all of the ports, save the port (B) of the regenerator (A) withdrawn from service, operate in the usual or normal way, described above. In the port B, however, the operation is modified. Specifically, a column C of fuel is jetted in normal manner into the port, but the air sustaining the combustion of such fuel is delivered through an auxiliary or temporary course. In this case air is supplied at atmospheric temperature to the hollow gate 16, and from such gate the air is delivered into the port, as indicated by the arrows in Figs. I and II. Thus, all ports on side 2a of the chamber 2 are fired in unison, while the products of combustion are in usual way drawn off through the ports on the opposite side 2b of the chamber.

When the furnace is reversed, all of the ports on the side 2b of the furnace chamber are operated in normal way to fire the furnace, while on the opposite side of the chamber the normal operation of the ports, in leading away the waste gases, is modified. That is to say, whereas in normal operation all three ports on the side 2a operate as outgo ports, each leading off a stream of waste gases from the furnace chamber, in the modified operation of this invention, the stream of waste gases normally flowing through port B is drawn to the port next adjacent thereto—the middle port, as indicated in Fig. III. The volume of the gases in the merged stream may in some case exceed the capacity of the middle port, in which event a portion of the combined stream is (as indicated in Fig. III) deflected to the third port.

The engineer and furnace man will readily perceive that, while the regenerator A is withdrawn from service, the dampers 15 and gates 16 of the regenerator units may be severally adjusted (upon each furnace reversal, if need be) to provide compensation for any unbalancing of furnace draft that is caused by the modified operation. It will also be understood that the periods of reversal may be changed, best to suit the modified conditions of operation.

When the regenerator has been rebuilt or reconditioned, the doorway 19 is closed, and the gate 16 and damper 15 are opened. Then the regenerator and port unit A, B is restored to normal operation. In the manner described each regenerator of the furnace may in turn be temporarily removed from service and reconditioned.

I have described how, with the regenerator A withdrawn from service, combustion-sustaining air is supplied to the port B through the hollow gate 16, and the port operated as a firing port (cf. Fig. I). It is contemplated that the flow of fuel and air into the port may with advantage be continued when the furnace is reversed, and the conditions of operation illustrated in Fig. III established. Preferably the flow of both the fuel and the air is diminished in quantity, to provide a lazy firing of the port B, during the interval in which the two neighboring ports are serving as outgo ports. This subdued firing of the port affords a two-fold advantage: first, the desired temperature conditions are maintained throughout the bath of molten glass 20; that is, a localized cooling of the bath in the vicinity of the port B is prevented; second, the slow firing of the port prevents the hot waste gases of the furnace from straying into the port, heating up the gate 16, and possibly leaking into the regenerator A in which the men are at work.

Figs. IV and V illustrate regenerators of known multiple-pass construction. Each regenerator or regenerator compartment 600 include three stages of checkerwork. The waste gases of the furnace descend through the first stage 21, rise through the second stage 22, and descend through the third stage 23, whence they flow into the flue 14. The principal difference between the two multiple-pass regenerators is that in the structure of Fig. IV the first stage of checkerwork 21 is arranged in the outer sub-compartment 600a, the sub-compartment most remote from the furnace chamber 2, whereas in the structure of Fig. V the inner or least remote sub-compartment 600b contains the primary stage 21 of checkerwork. In adapting furnaces including such regenerators to the practice of my invention, I provide dampers 15 and gates 16, as illustrated, and in the walls of the regenerators I provide manholes or doorways 190 that open into the primary stages of checkerwork. In reconstructing these regenerators, without interruption in the usual reversing operation of the furnace, there is no substantial departure from the method already described. While those skilled in the art know that it is primary stages of checkerwork that require most frequent repair and renewal, they will also understand that all stages may be renewed. Indeed, the entire regenerator may be reconstructed.

I claim as my invention:

1. In the operation of a reversing regenerator furnace that includes a plurality of ports on each of the two sides of the furnace and a corresponding plurality of regenerator units, means for withdrawing the regenerator units severally from service, and means for conveying an auxiliary stream of the gaseous material normally passing through the regenerator units on the intake side of the furnace, the method herein described of maintaining continuity of furnace operation while withdrawing one or another regenerator unit from service which consists in establishing flow from the auxiliary conveying means through one of the ports while the associate regenerator unit is withdrawn from service.

2. In the operation of a reversing regenerator furnace that includes a plurality of ports on each of the two sides of the furnace and a corresponding plurality of regenerator units severally communicating with said ports and adapted alternately to deliver preheated air to the ports and to receive waste gases drawn from the furnace through said ports, and inlet for introducing auxiliary streams of air to said ports; the method herein described of maintaining continuity of furnace operation while withdrawing from service and reconditioning one or another of said regenerator units which method consists in establishing, while the furnace is in operation during one phase of furnace reversal, flow of an auxiliary stream of air into one of the ports while the associate regenerator unit is withdrawn from service, and, while the furnace is in operation during the alternate phase of furnace reversal, leading off the stream of waste gases that normally flows through said regenerator unit with the stream flowing through a neighboring unit.

3. In the operation of a reversing regenerator furnace that includes a plurality of ports on each of the two sides of the furnace and a corresponding plurality of regenerator units severally communicating with said ports and adapted alternately to deliver preheated air to the ports and to receive waste gases drawn from the furnace through said ports, and inlets for introducing auxiliary streams of air to said ports; the method herein described of maintaining continuity of furnace operation while withdrawing from service and reconditioning one or another of said regenerator units which method consists in establishing, while the furnace is in operation during one phase of furnace reversal, flow of an auxiliary stream of air, together with flow of fuel, into one of the ports while the associate regenerator unit is withdrawn from service, and, while the furnace is in operation during the alternate phase of furnace reversal, leading off the stream of waste gases that normally flows through said regenerator unit with the stream flowing through a neighboring unit while continuing a flow of said auxiliary stream of air into said port.

4. The herein described method of operating a reversing regenerator furnace that consists normally in preheating air in a plurality of regenerator units on one side of the furnace and delivering the preheated air with fuel through a plurality of ports into the furnace chamber, while leading the hot waste gases through a plurality of ports and regenerator units on the opposite side of the furnace, and from time to time reversing such operation; occasionally modifying such normal operation by closing one of said regenerator units to the flow of waste gases and drawing off the stream of waste gases that normally flows through such unit with the stream flowing through a neighboring regenerator unit, and, upon furnace reversal, supplying air through an auxiliary passage into the associate port of said regenerator unit and delivering such air with fuel into the furnace, while maintaining the other ports and regenerator units of the furnace in substantially normal position, as described; and, while thus maintaining continuity of furnace operation, reconditioning said regenerator unit.

5. In a reversing regenerator furnace that includes a plurality of ports on each of the two sides of the furnace and a corresponding plurality of regenerator units severally communicating with said ports, passages severally establishing communication between regenerator units and a stack, and dampers severally controlling said passages, the refinement herein described that consists in means adapted to cooperate with said dampers for selectively withdrawing the regenerator units from service, and means for introducing to the regenerator unit withdrawn from service an auxiliary stream of the gaseous material that normally passes through such unit.

6. The structure of claim 5, in which said means include a gate movable between a position in which communication is established between the particular regenerator unit and its associate port, and a position in which such communication is blanked.

7. The structure of claim 5, in which said means include a hollow gate communicating with an air supply, said gate being movable between a position in which communication is established between the particular regenerator unit and its associate port, and a position in which communication between such unit and port is blanked and communication established between said port and said air supply.

SAMUEL A. FORTER.

CERTIFICATE OF CORRECTION.

Patent No. 2,179,848.  November 14, 1939.

SAMUEL A. FORTER.

It is hereby certified that error appears in the printed specification of the above numbered patent requiring correction as follows: Page 3, second column, line 26, claim 2, for the word "inlet" read inlets; page 4, first column, line 10, claim 4, for "position" read operation; and that the said Letters Patent should be read with this correction therein that the same may conform to the record of the case in the Patent Office.

Signed and sealed this 12th day of December, A. D. 1939.

(Seal)
Henry Van Arsdale,
Acting Commissioner of Patents.